(12) United States Patent
Jones et al.

(10) Patent No.: US 12,083,761 B2
(45) Date of Patent: Sep. 10, 2024

(54) SHOULDER ASSEMBLY FOR TIRE BUILDING MACHINE

(71) Applicants: William A. Jones, Greenback, TN (US); Stuart J. Hassell, Greenback, TN (US)

(72) Inventors: William A. Jones, Greenback, TN (US); Stuart J. Hassell, Greenback, TN (US)

(73) Assignee: Davian Enterprises, LLC, Greenback, TN (US)

( * ) Notice: Subject to any disclaimer, the term of this patent is extended or adjusted under 35 U.S.C. 154(b) by 85 days.

(21) Appl. No.: 17/237,322

(22) Filed: Apr. 22, 2021

(65) Prior Publication Data

US 2021/0347136 A1    Nov. 11, 2021

Related U.S. Application Data (60) Provisional application No. 63/013,867, filed on Apr. 22, 2020.

(51) Int. Cl.
| | |
|---|---|
| *B29D 30/24* | (2006.01) |
| *B29D 30/26* | (2006.01) |
| *B29D 30/32* | (2006.01) |

(52) U.S. Cl.
CPC .......... *B29D 30/245* (2013.01); *B29D 30/26* (2013.01); *B29D 30/32* (2013.01); *B29D 2030/2657* (2013.01); *B29D 2030/3264* (2013.01)

(58) Field of Classification Search
CPC .............................................. B29D 2030/2678
USPC ............................. 156/421.4, 420
See application file for complete search history.

(56) References Cited

U.S. PATENT DOCUMENTS

| | | | |
|---|---|---|---|
| 1,233,567 A | 7/1917 | William | |
| 1,750,728 A | 3/1930 | Robison | |
| 2,073,729 A | 3/1937 | Bostwick | |
| 2,168,897 A | 8/1939 | Bostwick | |

(Continued)

FOREIGN PATENT DOCUMENTS

| | | | |
|---|---|---|---|
| CA | 2142004 A1 | 8/1995 | |
| CA | 2188639 A1 | 4/1997 | |

(Continued)

OTHER PUBLICATIONS

ESpaceNet Translation of DE102009044510 (Year: 2022).*

(Continued)

*Primary Examiner* — Katelyn W Smith
*Assistant Examiner* — Alexander D Booth
(74) *Attorney, Agent, or Firm* — Blanchard Horton PLLC (57) ABSTRACT

A shoulder assembly for mounting on a tire building drum is provided that includes a plurality of sections configured to interlock with another to form a shoulder ring to be mounted on a tire building drum when the tire building drum is in an expanded state, and a plurality of magnetic elements provided about a surface of the shoulder ring that is configured to contact a side of the tire building drum. The magnetic elements correspond to holding magnetic elements in the tire building drum. The shoulder ring is configured to maintain contact with the tire building drum during forming of a tire carcass, and the shoulder ring is configured to maintain its shape and stay with the formed tire carcass when the tire building drum is collapsed.

18 Claims, 5 Drawing Sheets

(56) References Cited

U.S. PATENT DOCUMENTS

| | | |
|---|---|---|
| 2,201,469 A | 5/1940 | Bostwick |
| RE22,369 E | 8/1943 | Bostwick |
| 2,335,169 A | 11/1943 | Bostwick |
| 2,353,767 A * | 7/1944 | Schnedarek ......... B29D 30/248 242/575.5 |
| 2,367,831 A | 1/1945 | Manson |
| 2,529,861 A | 11/1950 | Angell et al. |
| 2,614,057 A | 10/1952 | Ericson et al. |
| 2,699,198 A | 1/1955 | Balzhiser |
| 2,715,932 A | 8/1955 | Frazier |
| 2,728,616 A | 12/1955 | Potter |
| 3,077,918 A | 2/1963 | John |
| 3,101,289 A | 8/1963 | Dario et al. |
| 3,111,444 A | 11/1963 | Jacques |
| 3,111,445 A | 11/1963 | Jacques et al. |
| 3,140,216 A | 7/1964 | Shilts et al. |
| 3,207,648 A | 9/1965 | Shilts |
| 3,346,434 A | 10/1967 | Fulton |
| 3,366,526 A * | 1/1968 | Winslow ............... B29D 30/248 156/420 |
| 3,375,154 A | 3/1968 | Ruttenberg et al. |
| 3,405,023 A | 10/1968 | Eckenwiler et al. |
| 3,408,244 A | 10/1968 | Frazier |
| 3,485,700 A | 12/1969 | Cooper et al. |
| 3,489,634 A | 1/1970 | Pizzo et al. |
| 3,507,528 A | 4/1970 | Desmarchais |
| 3,547,733 A | 12/1970 | Leblond |
| 3,598,673 A | 8/1971 | Renato |
| 3,607,558 A | 9/1971 | Nebout |
| 3,616,059 A | 10/1971 | Frazier |
| 3,644,162 A | 2/1972 | Appleby et al. |
| 3,676,261 A | 7/1972 | Appleby et al. |
| 3,694,290 A | 9/1972 | Pacciarini et al. |
| 3,695,974 A | 10/1972 | Henley |
| 3,740,293 A * | 6/1973 | Jones et al. ............ B29D 30/36 156/401 |
| 3,784,426 A | 1/1974 | Woodhall et al. |
| 3,787,262 A | 1/1974 | Appleby et al. |
| 3,816,218 A | 6/1974 | Felten |
| 3,833,444 A | 9/1974 | Mallory |
| 3,837,968 A | 9/1974 | Marra |
| 3,867,229 A | 2/1975 | Marra |
| 3,873,398 A | 3/1975 | Yokoo et al. |
| 3,887,423 A | 6/1975 | Gazuit |
| 3,929,546 A | 12/1975 | Katagiri et al. |
| 3,932,256 A | 1/1976 | Touchette |
| 3,948,717 A | 4/1976 | Suzuki et al. |
| 4,010,058 A | 3/1977 | Kubinski et al. |
| 4,105,487 A | 8/1978 | Suzuki et al. |
| 4,126,507 A | 11/1978 | Kim et al. |
| 4,128,450 A | 12/1978 | Cantarutti |
| 4,131,500 A | 12/1978 | Wilde et al. |
| 4,149,927 A | 4/1979 | Lauer, Jr. |
| 4,151,035 A | 4/1979 | Jellison |
| 4,155,796 A | 5/1979 | Rambacher |
| 4,190,482 A | 2/1980 | Yabe |
| 4,210,482 A | 7/1980 | Collins |
| 4,220,494 A | 9/1980 | Kawaida et al. |
| 4,230,517 A | 10/1980 | Enders |
| 4,239,579 A | 12/1980 | Felten et al. |
| 4,292,112 A | 9/1981 | Kumagai |
| 4,312,696 A | 1/1982 | Bryant |
| 4,324,604 A | 4/1982 | Alexander et al. |
| 4,325,764 A | 4/1982 | Appleby et al. |
| 4,392,899 A | 7/1983 | Bertoldo |
| 4,425,180 A | 1/1984 | Samokhvalov et al. |
| 4,436,574 A | 3/1984 | Long et al. |
| 4,445,962 A | 5/1984 | Felder |
| 4,469,546 A | 9/1984 | Klose et al. |
| 4,472,233 A | 9/1984 | Fukamachi et al. |
| 4,473,427 A | 9/1984 | Irie |
| 4,510,012 A | 4/1985 | Kawaida et al. |
| 4,519,279 A | 5/1985 | Ruggeri |
| 4,521,269 A | 6/1985 | Ozawa |
| 4,547,251 A | 10/1985 | Landsness |
| 4,582,557 A | 4/1986 | Enders |
| 4,626,302 A | 12/1986 | Casey et al. |
| 4,636,277 A | 1/1987 | Owen et al. |
| 4,729,541 A | 3/1988 | Maier |
| 4,780,171 A | 10/1988 | Byerley |
| 4,798,647 A | 1/1989 | Haas |
| 4,861,123 A | 8/1989 | Russell |
| 4,861,173 A | 8/1989 | Kemp |
| 5,047,108 A | 9/1991 | Byerley |
| 5,066,354 A | 11/1991 | Benjamin |
| 5,071,498 A | 12/1991 | Nishiide et al. |
| 5,078,819 A | 1/1992 | Sergel et al. |
| 5,089,077 A | 2/1992 | Byerley |
| 5,203,947 A | 4/1993 | Boeker |
| 5,223,074 A | 6/1993 | Miyanaga et al. |
| 5,225,028 A | 7/1993 | Bierens |
| 5,232,542 A | 8/1993 | Norjiri et al. |
| 5,264,068 A | 11/1993 | Masuda |
| 5,320,701 A | 6/1994 | Jellison et al. |
| 5,354,405 A | 10/1994 | Byerley |
| 5,380,384 A | 1/1995 | Tokunaga et al. |
| 5,441,587 A | 8/1995 | Byerley |
| 5,500,074 A | 3/1996 | Suzuki |
| 5,505,803 A | 4/1996 | Byerley |
| 5,558,733 A | 9/1996 | Byerley |
| 5,591,288 A * | 1/1997 | Becker ................. B29D 30/245 156/416 |
| 5,618,374 A | 4/1997 | Byerley |
| 5,634,745 A | 6/1997 | Wiman et al. |
| 5,635,016 A | 6/1997 | Byerley |
| 5,650,034 A | 7/1997 | Siegenthaler |
| 5,709,768 A | 1/1998 | Byerley |
| 5,735,995 A | 4/1998 | Bull et al. |
| 5,755,922 A | 5/1998 | Baldoni et al. |
| 5,766,408 A | 6/1998 | Ogawa |
| 6,004,250 A | 12/1999 | Byerley |
| 6,007,268 A | 12/1999 | Whittington et al. |
| 6,013,147 A | 1/2000 | Byerley |
| 6,058,999 A | 5/2000 | Roberts et al. |
| 6,117,269 A | 9/2000 | Pizzorno |
| 6,152,645 A | 11/2000 | Sanford |
| 6,238,292 B1 | 5/2001 | Pelkey |
| 6,336,485 B1 | 1/2002 | Kaneko et al. |
| 6,390,166 B1 | 5/2002 | Roberts et al. |
| 6,457,505 B1 | 10/2002 | Byerley |
| 6,475,319 B1 | 11/2002 | Akiyama |
| 6,539,998 B2 | 4/2003 | Sergel et al. |
| 6,571,682 B2 | 6/2003 | Roberts et al. |
| 6,585,022 B1 | 7/2003 | Rex |
| 6,602,372 B1 | 8/2003 | Byerley |
| 6,673,183 B2 | 1/2004 | Byerley |
| 6,793,752 B2 | 9/2004 | Lemaire et al. |
| 7,000,905 B1 | 2/2006 | Lutter et al. |
| 7,287,772 B2 | 10/2007 | James |
| 7,288,160 B2 | 10/2007 | Roedseth et al. |
| 7,370,897 B2 | 5/2008 | Fukazawa |
| 7,637,665 B2 | 12/2009 | Cook |
| 7,699,952 B2 | 4/2010 | Linne et al. |
| 7,837,816 B2 | 11/2010 | Linne et al. |
| 8,056,597 B2 | 11/2011 | Byerley |
| 8,091,602 B2 | 1/2012 | Roberts et al. |
| 8,272,417 B2 | 9/2012 | Painter |
| 8,555,944 B2 | 10/2013 | Painter |
| 8,602,078 B2 | 12/2013 | Byerley |
| 8,701,731 B2 | 4/2014 | Roberts et al. |
| 9,044,908 B2 | 6/2015 | Babin |
| 9,427,925 B2 | 8/2016 | Araki |
| 10,189,221 B2 | 1/2019 | Jones et al. |
| 2003/0056874 A1 | 3/2003 | Durand |
| 2003/0168144 A1 | 9/2003 | Weaver et al. |
| 2003/0197389 A1 | 10/2003 | Moilanen et al. |
| 2004/0239134 A1 | 12/2004 | Fukazawa |
| 2006/0000554 A1 | 1/2006 | Kitz et al. |
| 2008/0017298 A1 | 1/2008 | Iyanagi |
| 2008/0202690 A1 | 8/2008 | Painter |
| 2009/0151873 A1 | 6/2009 | Pinto et al. |
| 2010/0000658 A1 | 1/2010 | Roberts et al. |
| 2010/0101732 A1 | 4/2010 | Howley et al. |
| 2010/0186864 A1 | 7/2010 | Koopman et al. |

(56) References Cited

U.S. PATENT DOCUMENTS

| | | |
|---|---|---|
| 2011/0303366 A1 | 12/2011 | Byerley |
| 2012/0017720 A1 | 1/2012 | Painter |
| 2012/0033906 A1 | 2/2012 | Painter |
| 2012/0090787 A1 | 4/2012 | Jones et al. |
| 2012/0168087 A1 | 7/2012 | Byerley |
| 2012/0222822 A1 | 9/2012 | Jones et al. |
| 2012/0256434 A1 | 10/2012 | Roberts et al. |
| 2013/0008611 A1 | 1/2013 | Marcus et al. |
| 2013/0168023 A1 | 7/2013 | Babin |
| 2014/0048212 A1 | 2/2014 | Weaver et al. |
| 2014/0048213 A1 * | 2/2014 | Weaver ............... B29D 30/245 156/417 |
| 2014/0116601 A1 | 5/2014 | Bormann |
| 2014/0213330 A1 | 7/2014 | Oh |
| 2014/0360673 A1 | 12/2014 | Marcus, Jr. |
| 2015/0028147 A1 | 1/2015 | Rich |
| 2015/0239190 A1 | 8/2015 | Currie et al. |
| 2016/0159023 A1 | 6/2016 | Delorme et al. |
| 2016/0176138 A1 | 6/2016 | Guzman |
| 2020/0101682 A1 | 4/2020 | Hassell et al. |
| 2020/0238647 A1 | 7/2020 | McCleery |

FOREIGN PATENT DOCUMENTS

| | | | |
|---|---|---|---|
| CA | 2219387 A1 | 4/1998 | |
| DE | 2705504 A1 | 8/1978 | |
| DE | 19913241 C1 | 9/2000 | |
| DE | 102009025759 A1 | 11/2010 | |
| DE | 102009044510 A1 * | 5/2011 | ........... B29D 30/242 |
| EP | 1621327 A1 | 2/2006 | |
| EP | 1688240 A1 | 8/2006 | |
| EP | 2155481 A1 | 2/2010 | |
| EP | 2504159 A1 | 10/2012 | |
| EP | 2928678 A2 * | 10/2015 | ............. B29D 30/24 |
| GB | 2323573 A | 9/1998 | |
| JP | 58179633 A | 10/1983 | |
| JP | S60196330 A | 10/1985 | |
| JP | 2007136935 A | 6/2007 | |
| JP | 2008221750 A | 9/2008 | |
| JP | 2009274392 A | 11/2009 | |
| JP | 2011255768 A | 12/2011 | |
| JP | 5562470 B1 | 7/2014 | |
| KR | 100963503 B1 | 6/2010 | |
| NL | 9401271 A | 3/1995 | |
| RU | 2381899 C2 | 2/2010 | |
| SU | 1106682 A1 | 8/1984 | |
| WO | 2001007242 A1 | 2/2001 | |
| WO | 2006003058 A1 | 1/2006 | |
| WO | 2008025598 A1 | 3/2008 | |
| WO | 2008152453 A1 | 12/2008 | |
| WO | 2009058296 A1 | 5/2009 | |
| WO | 2010052103 A1 | 5/2010 | |
| WO | 2011064500 A1 | 6/2011 | |
| WO | 2011159343 A1 | 12/2011 | |
| WO | 2012021160 A1 | 2/2012 | |
| WO | 2012031193 A1 | 3/2012 | |

OTHER PUBLICATIONS

"International Search Report and the written opinion received for PCT Patent Application No. PCT/US2019/053428, mailed on Jan. 17, 2020", 4 Pages.

"International Search Report nd the Written Opinion received for PCT Patent Application No. PCT/US2020/015445, mailed on May 7, 2020", 5 Pages.

Kim, Harry, "International Search Report and Written Opinion", 8 Pages.

* cited by examiner

SHOULDER ASSEMBLY FOR TIRE
BUILDING MACHINE

CROSS-REFERENCE TO RELATED
APPLICATIONS

This application claims the benefit of U.S. Provisional Patent Application Ser. No. 63/013,867, filed on Apr. 22, 2020, the content of which is incorporated herein by reference.

FIELD OF INVENTION

The present general inventive concept relates to a tire building machine, and, more particularly, to a shoulder assembly to attach to a tire building machine to form outer ridges of a tire carcass.

BACKGROUND

The manufacture of a vehicle tire commonly includes the steps of forming a tire carcass, forming a belt and tread portion of the tire separately of the carcass, and thereafter marrying the belt and tread portion of the tire to the carcass to form a "green" tire. The green tire is thereafter treated to form the tread and various other features of the tire and to vulcanize the rubber components of the tire.

Formation of the various portions of a tire is typically accomplished using one or more tire building drums of the type defining a cylindrical working surface. For example, formation of the tire carcass portion of the tire is typically accomplished on a rotatable and expandable and collapsible tire building drum commonly referred to as a "first stage drum" or a "carcass drum". Certain designs of carcass drums are designed to be radially expandable and collapsible, and may be referred to as a "radial expand/collapse" drum or "REC" drum. In typical carcass drums, the rotatable drum comprises a plurality of segments defining the outer circumference of the drum. The segments forming the outer circumference of the drum are adapted to be driven between an expanded position, in which a tire carcass may be formed on the drum, and a collapsed position, in which a formed carcass may be removed from the tire building drum.

With the carcass drum configured in the expanded position, the carcass drum is rotated about a central axis. As the carcass drum rotates, individual components of the tire carcass are overlaid onto an outer circumference of the drum to form a plurality of cylindrical-shaped layers. At least one, and in some cases multiple, rigid or semi-rigid rings called "beads" are positioned surrounding each opposite circumferential end of the tire carcass layers. The circumferential ends of the tire carcass layers are then wrapped over the respective beads and joined to the more inward surface portions of the tire carcass layers to form finished outer circumferential edges of the tire carcass.

Typical carcass drums are often equipped with rounded outer circumferential edges of the working surface of the drum, called "shoulders". These outer shoulders of the drum are typically contoured to allow the beads and outer circumferential edges of a finished tire carcass to wrap over and extend slightly radially inward from the outer working surface of the drum. Thus, when the tire carcass is formed and finished on the outer working surface of the carcass drum, the radially inward extension of the beads and outer circumferential edges of the finished tire carcass serve to "trap" the carcass drum within the finished tire carcass. In other words, so long as the carcass drum remains in the expanded position, the tire carcass is form fitted to the exterior working surface and the inwardly-curved shoulders, and thus cannot be removed from the carcass drum. However, when driven to the collapsed position, the finished tire carcass may be removed from the carcass drum and transported to subsequent tire building drums for further operations in the manufacture of a tire.

When a tire carcass is transported from a carcass drum to subsequent drums for continued tire manufacture, it is not uncommon for the tire carcass to deform, thereby resulting in at least a portion of the tire carcass forming imperfections, such as for example crimps, bulges, thin spots, or the like. When a finished tire that includes these imperfections rolls across a surface, repeated contact of the portions of the tire containing the imperfections in the tire components with the surface can, in certain circumstances, result in undesirable performance features of the finished tire, such as for example vibration and/or resonance of the rolling tire. Such vibration and/or resonance can result in undesirable noise and/or shaking of the tire, increased wear and shortened life of the tire, and in some extreme instances, catastrophic failure of the tire.

For these and other reasons, various prior art designs for carcass drums include removable shoulder rings which may be fastened to the circumferential edges of the outer working surface of an expanded carcass drum to define the shoulder portions of the carcass drum while a tire carcass is being formed, and which may be unfastened from the circumferential edges of the outer working surface of the carcass drum to allow the outer working surface of the carcass drum to be collapsed. Thereafter, the finished tire carcass, along with the removable shoulder rings positioned within the inner circumference of the tire carcass, may be removed from the carcass drum. The tire carcass may then be transported with the shoulder rings held within the tire carcass inward of the bead edges, such that the shoulder rings continue to support the bead edges of the tire carcass in a substantially circular configuration during transport. Each shoulder ring typically defines a number of segments fastened together to form the rounded working surface of the carcass drum shoulder. Thus, once the tire carcass is ready to be positioned on a subsequent tire building drum for continued manufacture of a tire, each shoulder ring may be disassembled and removed from within the tire carcass.

Several prior art designs for shoulder rings employ threaded fasteners, such as screws, bolts, or the like, to accomplish fastening together of the segments to form the shoulder ring, as well as to accomplish fastening the shoulder ring to a corresponding edge of the outer working surface of a carcass drum. For designs employing such threaded fasteners, the time taken to accomplish the physical fastening and unfastening of the removable shoulder rings from a carcass drum, as well as the physical disassembly of each shoulder ring to remove the shoulder ring from within the tire carcass, can result in significant downtime during the tire manufacture process. Furthermore, this process results in significant additional labor associated with the repeated disassembly and reassembly of the shoulder rings, as well as their repeated fastening to and unfastening from the carcass drum. Thus, there exists a need to improve the design of a carcass drum and a removable shoulder ring for a carcass drum in order to increase efficiency of tire carcass fabrication and the tire manufacture process.

BRIEF SUMMARY OF THE INVENTION

According to various example embodiments of the present general inventive concept, a shoulder assembly is provided to be easily mounted on a tire building drum without fasteners, and to maintain its position inside a tire carcass when the tire building drum is collapsed.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a shoulder assembly to be mounted on a tire building drum, the shoulder assembly including a plurality of sections configured to interlock with another to form a shoulder ring to be mounted on a tire building drum when the tire building drum is in an expanded state, and a plurality of magnetic elements provided about a surface of the shoulder ring that is configured to contact a side of the tire building drum, the magnetic elements corresponding to holding magnetic elements in the tire building drum, wherein the shoulder ring is configured to maintain contact with the tire building drum during forming of a tire carcass, and wherein the shoulder ring is configured to maintain its shape and stay with the formed tire carcass when the tire building drum is collapsed.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a shoulder assembly is provided to be used with a tire building machine, the shoulder assembly being configured to be attached to a carcass drum when the drum is expanded, but remaining in the tire carcass and separating from the drum when the drum is collapsed. It is understood that a pair of shoulder assemblies, a single of which may be referred to herein simply as a "shoulder," according to the present general inventive concept may be provided, with one shoulder secured to each of two opposite sides of a carcass drum during the formation of the tire carcass. However, for the sake of clarity, only one (i.e., one side) of the pair of shoulder assemblies will typically be described and illustrated herein. Furthermore, the terms "drum," "tire building drum," and/or "carcass drum" may be used interchangeably herein.

Figure 1:
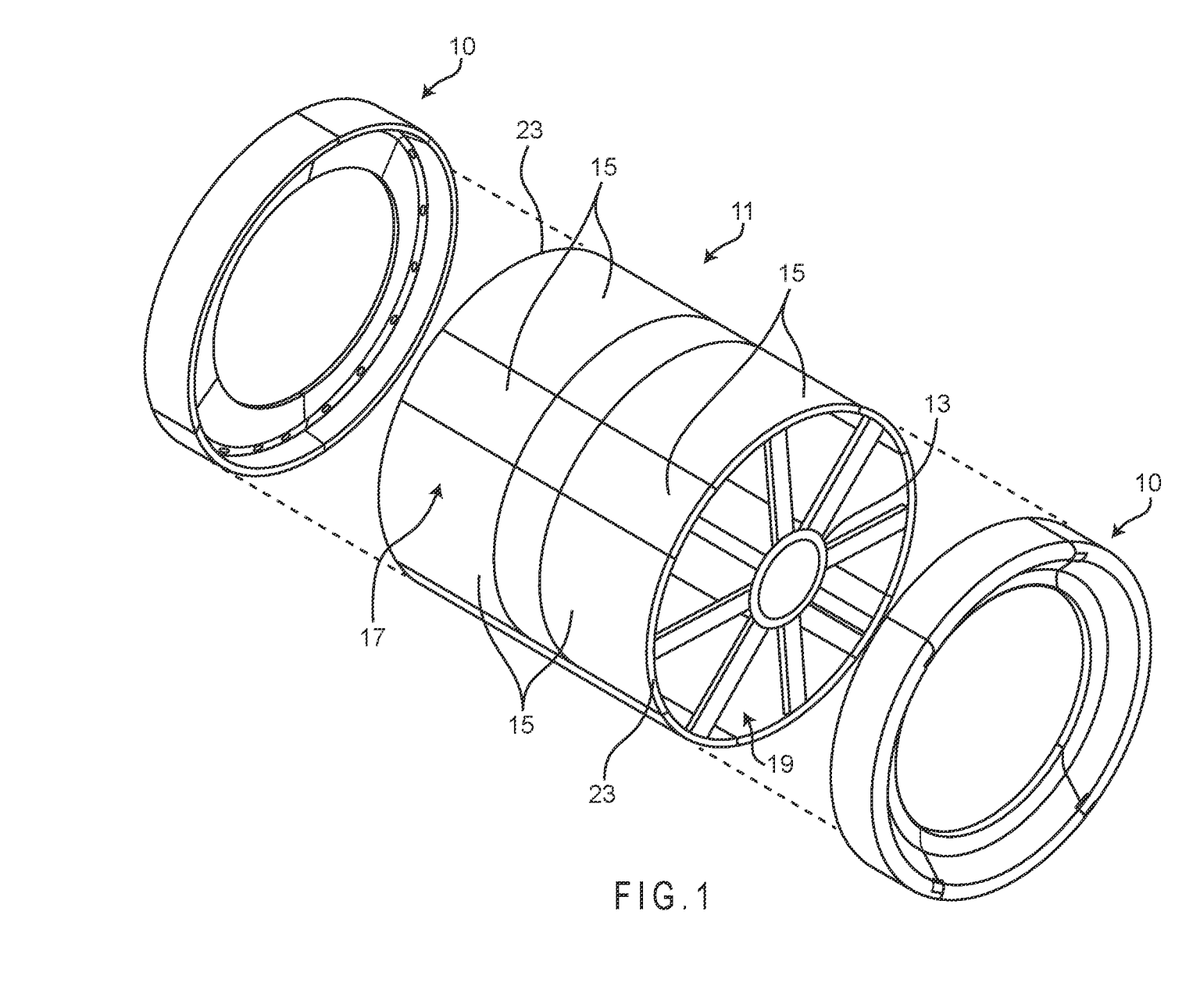
FIG. 1 illustrates a perspective view of a simplified representation of a carcass drum including a pair of shoulder assemblies according to one example embodiment of the present general inventive concept, with the carcass drum shown in an expanded position.
Figure 2:
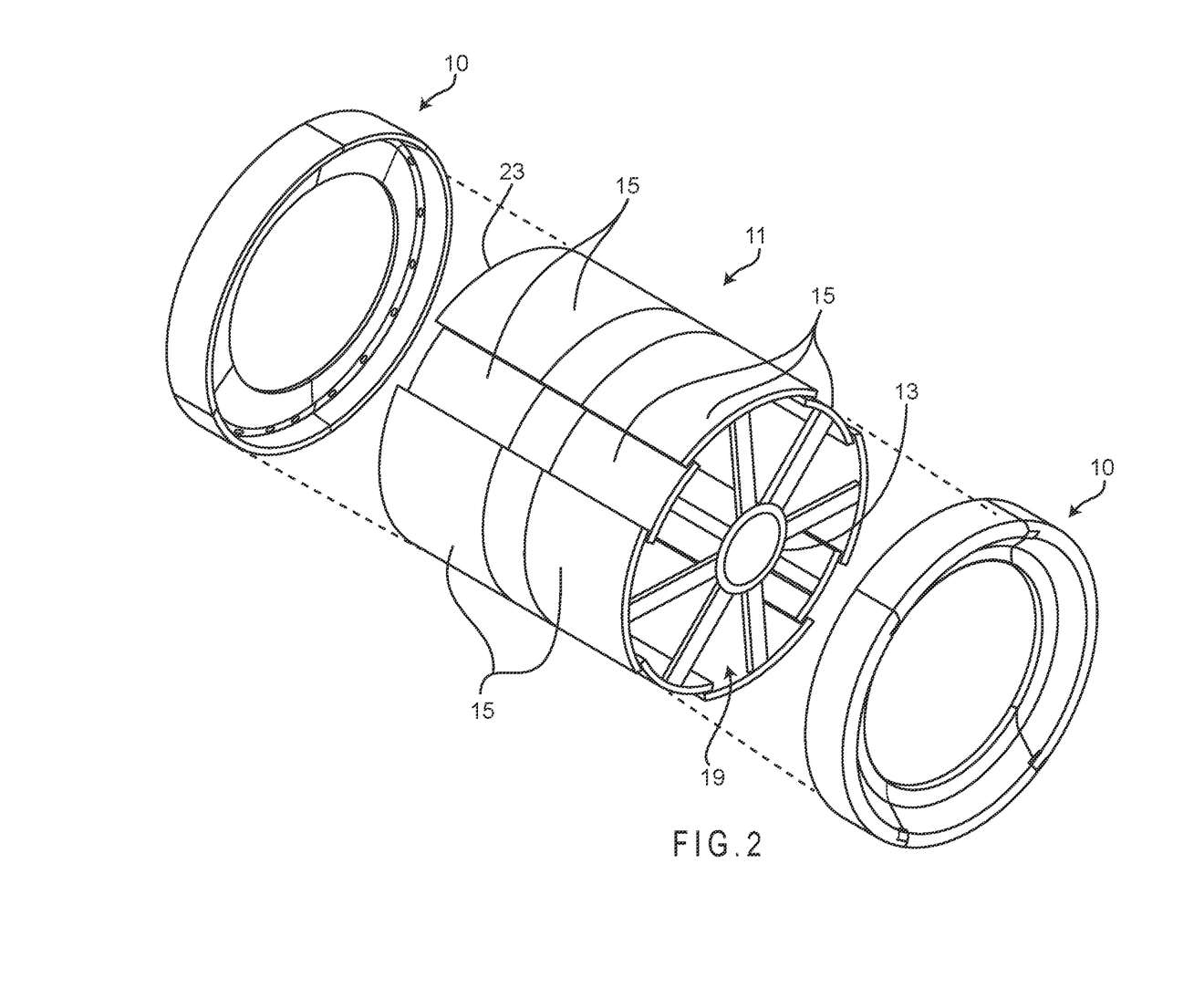
FIG. 2 illustrates a perspective view of the simplified representation of the carcass drum and shoulder assemblies of FIG. 1, with the carcass drum shown in a collapsed position.

FIGS. 1 and 2 each illustrate a perspective view of a simplified representation of a carcass drum 11, including a pair of shoulder assemblies 10 constructed in accordance with one example embodiment of the present general inventive concept. It will be recognized that the shoulder assembly of the present general inventive concept may be used in connection with any of a large variety of designs of tire building drums. However, the simplified representation of the carcass drum 11 shown in FIGS. 1 and 2 is provided in order to illustrate various components of a carcass drum 11 which may be provided for use in connection with the shoulder assemblies 10 of the present general inventive concept. In this regard, the carcass drum 11 shown in FIGS. 1 and 2 includes generally an elongated central hub assembly 13, along with a plurality of substantially arcuate segments 15 supported about the hub assembly 13 in a substantially cylindrical configuration and configured for expanding and contracting movement between an expanded position (see FIG. 1) and a collapsed position (see FIG. 2). In the expanded position, shown in FIG. 1, the segments 15 are arranged in an edge-to-edge configuration such that the segments 15 cooperate to form a substantially smooth cylindrical outer working surface 17 having a pair of opposite circumferential edges 23 defined by cooperating end edges of the arcuate segments 15. In the collapsed position, shown in FIG. 2, the segments 15 are drawn toward the central hub assembly 13 in a substantially overlapping configuration such that the overall carcass drum 11 has a relatively small overall diameter as compared to the diameter of the outer working surface 17 defined when the drum is in the expanded position.

It will be recognized that additional mechanical linkages and internal components 19 of the carcass drum 11 are provided to effect mounting of the segments 15 of the carcass drum 11 in relation to the central hub assembly 13 and to effect movement of the segments 15 between the collapsed position and the expanded position. However, a description of specific details of such mechanical linkages and internal components 19 is not necessary to the understanding of the present general inventive concept. Thus, for the convenience of this description, those additional internal mechanical linkages and internal components 19 are illustrated in a simplified manner in FIGS. 1 and 2. One of ordinary skill in the art will understand the structure and operation of the various mechanical linkages and internal components 19 of the carcass drum in view of multiple publications, such as for example U.S. Pat. No. 8,272,417, issued to Painter. However, it will be understood that numerous other designs and configurations of tire building drums may also be used without departing from the spirit and scope of the present general inventive concept.

Figure 3:
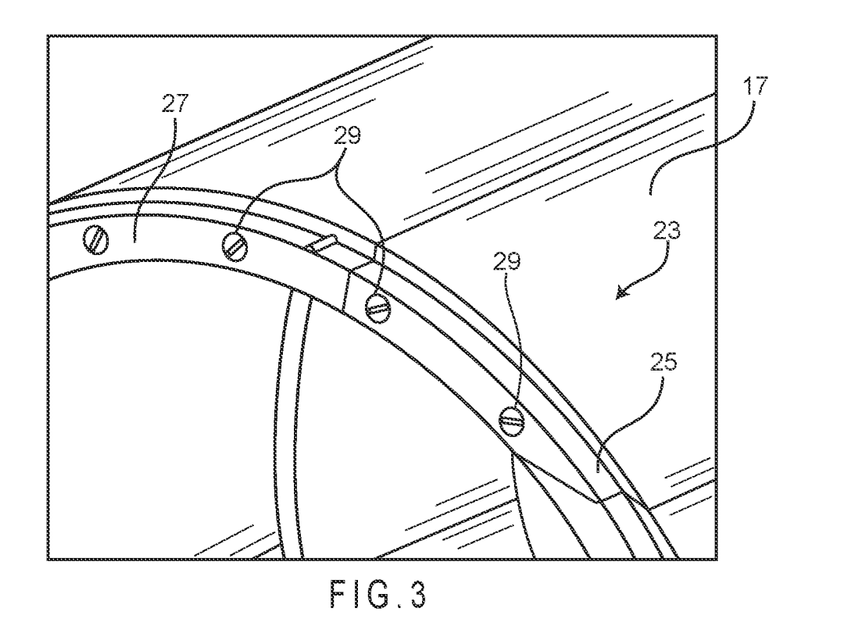
FIG. 3 illustrates a partial perspective view of a circumferential edge of a cylindrical outer working surface of the carcass drum of FIGS. 1 and 2.

FIG. 3 illustrates a perspective view of one of the circumferential edges 23 of the cylindrical outer working surface 17 of the carcass drum 11 of FIGS. 1 and 2. According to various example embodiments of the present general inventive concept, the circumferential edges 23 of the carcass drum 11 each define a circumferential lip 25 which is offset slightly radially inwardly from the outer working surface 17 of the carcass drum 11 and which extends axially outwardly from the outer working surface 17 of the drum. Each circumferential lip 25 defines an axially outwardly facing annular planar surface 27. As will be further discussed below, a plurality of magnetic elements 29 are provided at spaced-apart intervals about the circumferential lip 25, with each magnetic element 29 being embedded in the lip 15 and facing axially outwardly along the annular planar surface 27 of the lip 25. As described more fully herein, each shoulder assembly 10 may be configured to be attached to a corresponding outer circumferential edge 23 of the carcass drum 11 via the plurality of magnetic elements 29 disposed about the circumferential edge 23 of the carcass drum 11, and via an additional plurality of magnetic elements disposed about the shoulder assembly 10. Thus, the shoulder assembly 10 can be mounted upon the carcass drum 11 either in an assembled state, or can be assembled by mounting one piece of the shoulder assembly 10 at a time on the carcass drum 11.

Figure 4:
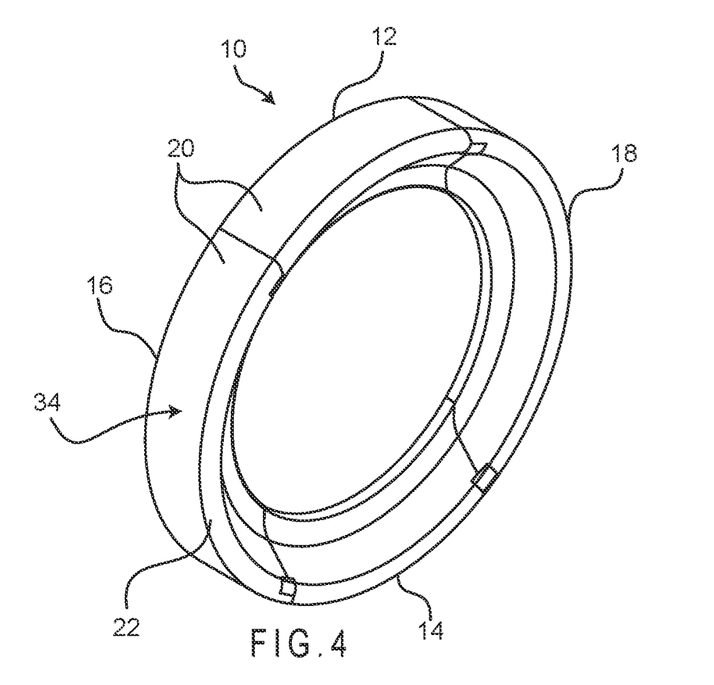
FIG. 4 illustrates a perspective view of a shoulder assembly according to an example embodiment of the present general inventive concept.

Referring now to FIG. 4, there is shown a single shoulder assembly 10 according to one example embodiment of the present general inventive concept. As can be seen in FIGS. 1 and 2, the view illustrated in FIG. 4 is of the outer side of the shoulder assembly 10 that faces away from the carcass drum 11 when mounted thereon. As illustrated in FIG. 4, the shoulder assembly 10 includes a plurality of arcuate and interconnecting sections. In this example embodiment, four sections are provided, which for the convenience of this description can be referred to as a top section 12, a bottom section 14, a first side section 16, and a second side section 18. Each section 12, 14, 16, 18 is formed of a substantially rigid material, such as for example steel, aluminum, plastic, polyurethane, or the like. In various example embodiments, each section 12, 14, 16, 18 may be formed of a non-magnetic material, such as for example polyurethane or other plastic, aluminum, or the like. In certain more discreet embodiments, one or more of the sections of the shoulder assembly may be formed of polyurethane.

Each of the sections 12, 14, 16, 18 defines a substantially smooth, arcuate outer surface 20, and, as will be described in further detail below, each section 12, 14, 16, 18 is adapted to be releasably connected to each of opposite adjacent sections 12, 14, 16, 18 in an end-to-end configuration, such that the sections 12, 14, 16, 18 cooperate to form a circular ring shape. In this configuration, the various outer surfaces 20 of the sections 12, 14, 16, 18 cooperate to define a substantially cylindrical outer working surface 34 of the shoulder assembly 10. Additionally, each section 12, 14, 16, 18 defines an outermost edge 22 having a rounded shape, such that when the sections 12, 14, 16, 18 are connected in an end-to-end configuration, the various outer edges 22 of the sections 12, 14, 16, 18 cooperate to define a substantially smooth and rounded contour defining a radially-inwardly curved shoulder surface suitable for use in forming a finished outer circumferential edge of a tire carcass. In various example embodiments of the present general inventive concept, the outer working surface 34 of the shoulder assembly 10 is formed to be substantially flush with the outer cylindrical working surface 17 of a carcass drum 11 when the carcass drum 11 is in the expanded position (see FIG. 1).

Figure 5:
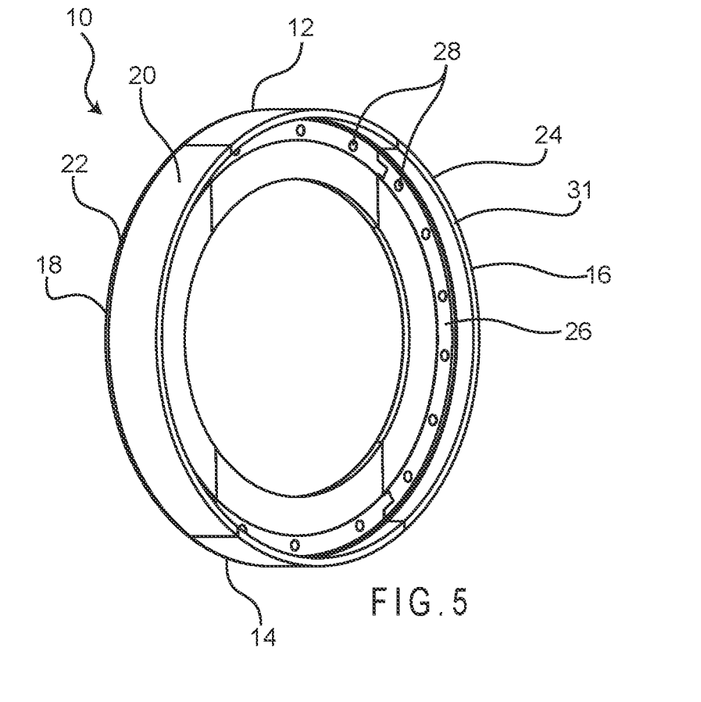
FIG. 5 illustrates a perspective view of another side of the shoulder assembly of FIG. 4.

FIG. 5 illustrates a perspective view of the inner side of the shoulder assembly 10 of FIG. 4. As previously described, FIG. 4 illustrates the side of the shoulder assembly 10 that faces away from the carcass drum 11 when mounted thereon. Thus, FIG. 5 illustrates the side of the shoulder assembly 10 that faces and contacts the outer circumferential edge 23 of the carcass drum 11 when the shoulder assembly 10 is mounted thereon. The shoulder assembly 10 is formed such that an innermost circumferential edge 24 of the outer working surface 34 of the shoulder assembly 10 defines a lip 31 that is sized and shaped to fit onto and conform to the corresponding circumferential lip 25 of the corresponding edge 23 of the carcass drum 11 when the shoulder assembly 10 is mounted thereon. Thus, when the shoulder assembly 10 is positioned onto the outer circumferential edge 23 of the carcass drum 11 with the circumferential lip 25 of the drum 11 fully received within the lip defined by the circumferential edge 24 of the outer working surface 34 of the shoulder assembly 10, the two lips engage one another to position and maintain the outer working surface 34 of the shoulder assembly 10 flush and coaxial with the outer working surface 17 of the carcass drum 11.

With further reference to FIG. 5, the shoulder assembly 10 has an axially inward facing annular planar surface 26 that is offset axially inwardly from the lip 31 defined by the circumferential edge 24 of the outer working surface 34, and that extends radially inwardly from the lip 31. This radially inwardly extending annular surface 26 is configured to contact the above-discussed outer side surface 27 of the circumferential edge 23 of the carcass drum 11 when the lip 31 defined by the circumferential edge 24 of the outer working surface 34 of the shoulder assembly 10 is fully received onto the corresponding circumferential lip 25 of the corresponding edge 23 of the carcass drum 11. The radially inwardly extending annular surface 26 of the shoulder assembly 10 is provided with a plurality of magnetic elements 28 arranged thereon which correspond to the magnetic elements 29 provided about the outer side surface 27 of the circumferential lip 25 of the carcass drum 11. Thus, when the carcass drum 11 is moved to the expanded position and the shoulder assembly 10 is positioned onto the outer circumferential edge 23 of the carcass drum 11 with the circumferential lip 25 of the drum 11 fully received within the lip defined by the circumferential edge 24 of the outer working surface 34 of the shoulder assembly 10, each of the magnetic elements 28 of the shoulder assembly 10 may magnetically couple with and attract a corresponding one of the magnetic elements 29 of the carcass drum 11 to establish a releasable magnetic connection, thereby releasably securing the shoulder assembly 10 in position along the axial edge 23 of the carcass drum 11.

Figure 6:
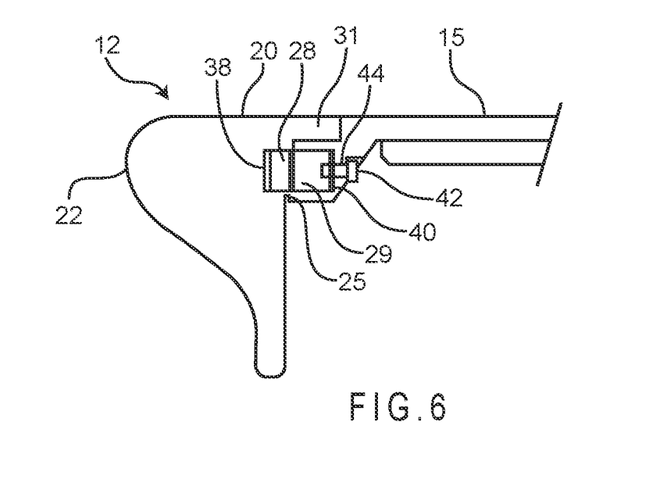
FIG. 6 illustrates a cross-sectional view of a top section of the shoulder assembly of FIG. 5, mounted to an arcuate segment of a carcass drum.

FIG. 6 illustrates a cross-sectional view of the top section 12 of the shoulder assembly 10 of FIG. 5, mounted to one of the arcuate segments 15 forming the outer working surface 17 of the carcass drum 11. As illustrated in FIG. 6, in various example embodiments, the magnets 28, 29 in the shoulder assembly 10 and the carcass drum 11 may be housed within aluminum shells 38, 40 in which the magnet position may be adjustable, so that the force of magnetic attraction on the shoulder assembly 10 may be changed to an optimal force. For example, in the illustrated embodiment, each of the magnetic elements 28, 29 is defined by a magnetic steel plug which is contained within a correspondingly sized aluminum shell 38, 40 disposed within a blind bore defined in the corresponding shoulder assembly 10 or the carcass drum 11. In the illustrated embodiment, each magnetic element 28 of the shoulder assembly 10 is fixed within the corresponding aluminum shell 38 via a frictional connection, adhesive, or the like. However, the magnetic element 29 of the carcass drum 11 is slidably received within the corresponding aluminum shell 40. An adjustable set screw 42 is disposed within a through bore 44 defined by the arcuate segment 15 of the carcass drum 11 and is configured to extend into the aluminum shell 40 to threadably engage the corresponding magnetic element 29. Thus, the adjustable set screw 42 may be rotatably adjusted to extend the magnetic element 29 of the carcass drum 11 toward the magnetic element 28 of the shoulder assembly 10, or to retract the magnetic element 29 of the carcass drum 11 away from the magnetic element 28 of the shoulder assembly 10. In this manner, the distance between corresponding pairs of mated magnetic elements 28, 29 may be adjusted when the shoulder assembly 10 is mounted to the circumferential edge of the carcass drum 11, thereby adjusting the force of attraction between each of the mated pairs of magnetic elements 28, 29 to achieve optimal force. With such an arrangement of magnetic elements, no other fastening/attachment devices are needed to hold the shoulder assembly 10 on the carcass drum 11.

In the illustrated embodiment of FIG. 6, the magnetic element 28 of the shoulder assembly 10 is shown as fixed, while the set screw 42 and adjustable magnetic element 29 is illustrated in connection with the arcuate segment 15 forming the outer working surface 17 of the carcass drum 11. However, this arrangement may be reversed without departing from the spirit and scope of the present general inventive concept. In other words, in other example embodiments, the magnetic elements 28 of the shoulder assembly 10 may be adjustable, while the magnetic elements 29 of the carcass drum 11 may be fixed. In various other example embodiments, each of the magnetic elements 28, 29 in the shoulder assembly 10 and the carcass drum 11 may be fixed within a corresponding shell, or within blind bores defined within the corresponding shoulder assembly 10 or carcass drum 11. In still other embodiments, a carcass drum may be used in which no magnetic elements are provided thereon, and in which the magnetic elements 28 of the shoulder assembly 10 are configured to magnetically couple directly to the arcuate segments 15 forming the outer working surface 17 of the carcass drum 11.

It will be recognized that, in various embodiments similar to those shown in FIGS. 1-6, when the carcass drum 11 is in an expanded state, and the shoulder assembly 10 is mounted thereon and held in place by the magnetic elements 28, 29, a tire carcass may be formed on the carcass drum 11 and shoulder assembly 10. When the carcass drum 11 is collapsed, the interlocking shoulder assembly 10 stays in place within the tire carcass. The separation of the carcass drum 11 from the shoulder assembly is relatively easy, as the magnetic elements 28 of the shoulder assembly 11 and the magnetic elements 29 of the carcass drum 11 are facing each other when the carcass drum is in an expanded state, and when the carcass drum is collapsing, the carcass drum segments 15 move in a "wiping" or "shearing" radial force that separates the paired magnetic elements 28, 29 in an easier fashion than would be encountered by pulling the elements axially apart from one another.

Figure 7:
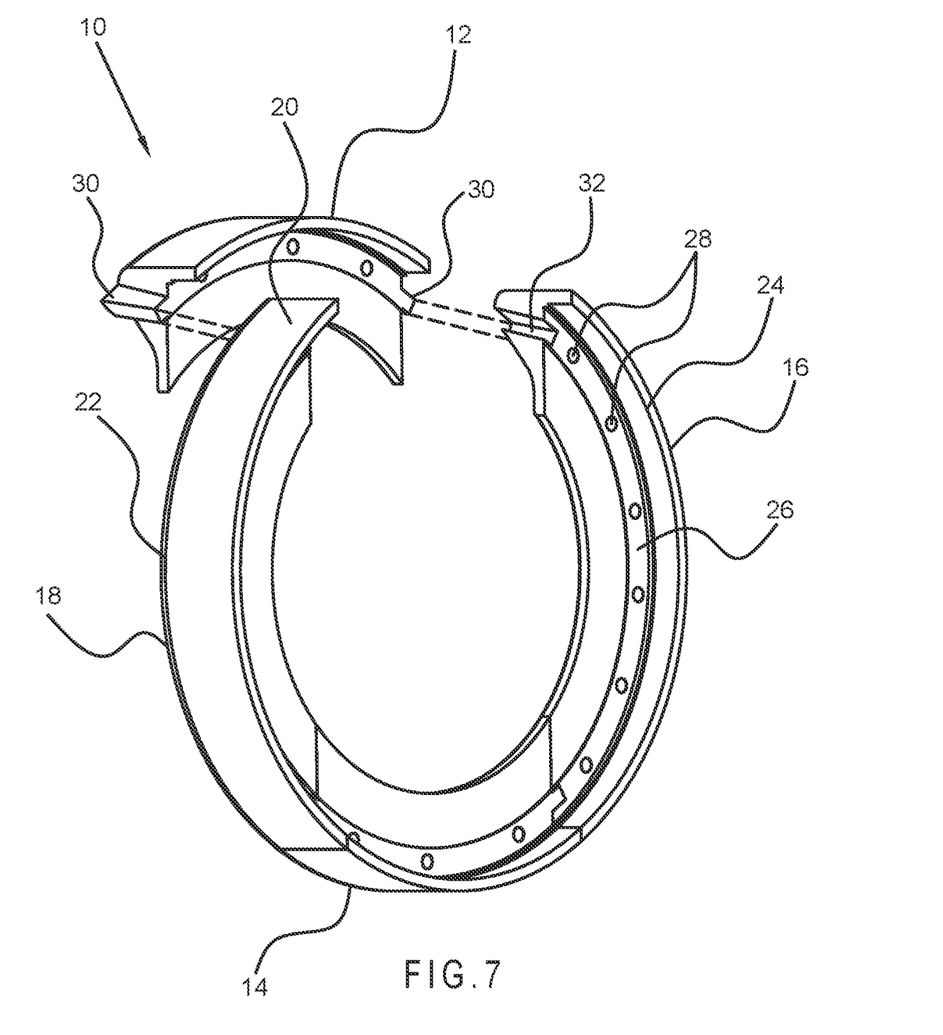
FIG. 7 illustrates the shoulder assembly of FIG. 5 with a top section disassembled from the shoulder assembly.

FIG. 7 illustrates the shoulder assembly of FIG. 5 with the top section 12 disassembled from the shoulder assembly 10. As illustrated in FIG. 7, the top section 12 of the shoulder assembly 10 is formed with a tongue or tenon 30 extending from each end, the tenon 30 corresponding to a groove 32 formed in the top ends of both the first and second side sections 16, 18. Similarly, the bottom section 14 of the shoulder assembly 10 is formed with tenons 30 extending from each end, corresponding to grooves 32 formed in the bottom ends of the first and second side sections 16, 18. In various example embodiments, the tenons 30 and grooves 32 may be configured with substantially the same curvature as the outer diameter (comprised of the various arcuate outer surfaces 20) of the shoulder assembly 10. Thus, as illustrated in FIG. 7, assembly of the top section 12 to the first and second side sections 16,18 is performed by moving the top section 12 in a lateral motion to slide the tenons 30 into the grooves 32. With such a configuration, assembly and disassembly is convenient and relatively easy, and the pieces of the shoulder assembly 10 can spin with the drum during forming of a tire carcass without being spun off by the force of the spin. In various example embodiments the tenons 30 and corresponding grooves 32 may be formed at an angle relative to the outer diameter or may be formed with an increasing width or thickness from one end to the other. In various example embodiments the tenons 30 could be configured with a profile to use various other connections such as, for example, a hook, a T-shape, a jigsaw profile, and so on, to secure the pieces of the shoulder assembly 10 to be able to spin with the drum without being spun off by the force of the spin. These tenon 30 interlocks may, in various example embodiments, be a separate bolt on part to be coupled to the side sections of the shoulder assembly 10. Such configurations may improve wear, ease of manufacture, maintenance, etc. In various example embodiments the shoulder segments may be formed of polyurethane or aluminum. In various example embodiments of the present general inventive concept a shoulder assembly can be formed without the innermost edge 24 lip and may rely on the magnetic elements alone to hold the shoulder assembly on the tire building drum.

Various example embodiments of the present general inventive concept may provide a "loose shoulder" concept that does not use any fixed fasteners, and that relies only on the above-discussed magnetic elements to secure the shoulders to the carcass drum, the aim being to reduce de-core time when building triple and double bead tires, typically aircraft, agricultural, and off-the-road (OTR) tires. Various example embodiments may use polyurethane shoulder segments that are held in place on the drum by magnets. The shoulder segments themselves are tenon jointed to each other to form a complete ring, and the tenons act as a safety feature to stop segments displacing radially as the drum is spun. Corresponding magnets in the drum may be housed within aluminum shells, and the magnets may be adjustable in position to optimize the magnetic force required to hold the shoulder in place but also allow the drum to collapse. Various example embodiments of the loose shoulders may have a steel plug embedded or a magnet, the plugs or magnets aligning with the holding magnets in the aluminum shells and therefore providing shoulder alignment.

Unlike conventional shoulders, the shoulders of the present general inventive concept can remain in the carcass while the tire drum is collapsed and the carcass, complete with the shoulders, is removed from the tire building machine. The drum will collapse away from the shoulders, breaking the magnetic effect via a wiping action instead of a straight pull away, which would demand more force. The shoulders may be in four sections. Steel equivalent shoulders have six sections and weigh approximately 10 kilograms each. The polyurethane sections of the present general inventive concept may weigh only approximately 5 kilograms each. In various example embodiments, there may be two parallel cut key section shoulders, the parallel cut coupled with a tenon that will allow the key shoulders to be passed in to form the shoulder ring assembly, and then the same key segments can be withdrawn internally with the tire carcass encasing the shoulder assembly, until the tire carcass is removed from the tire building machine with the shoulders, and the shoulders will be trapped in place by the register of the tire carcass.

Various example embodiments of the present general inventive concept may provide a shoulder assembly to be mounted on a tire building drum, the shoulder assembly including a plurality of sections configured to interlock with another to form a shoulder ring to be mounted on a tire building drum when the tire building drum is in an expanded state, and a plurality of magnetic elements provided about a surface of the shoulder ring that is configured to contact a side of the tire building drum, the magnetic elements corresponding to holding magnetic elements in the tire building drum, wherein the shoulder ring is configured to maintain contact with the tire building drum during forming of a tire carcass, and wherein the shoulder ring is configured to maintain its shape and stay with the formed tire carcass when the tire building drum is collapsed. One or more of the sections may be formed of, or include, polyurethane. The shoulder assembly may further include a lip extending to cover a portion of a circumference of the tire building drum when the shoulder ring is mounted on the tire building drum. The sections may interlock with one another at each end with tenon and groove connections configured to prevent the sections from displacing radially when the tire building drum spins.

One primary benefit of the present general inventive concept is reducing de-core time compared to conventional methods of tire assembly. Conventional shoulder methods demand manual intervention to remove each section prior to the drum being collapsed. Various example embodiments of the present general inventive concept eliminate such manual intervention at this early stage in production, as the drum simply collapses, leaving the shoulder ring in situ. In various example embodiments the use of polyurethane, aluminum, etc., presents the opportunity to have lighter and/or fewer shoulder assembly sections, and as such the re-assembly of the shoulders post removal from the carcass will be quicker than with conventional systems.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A shoulder assembly to be mounted on an expandable and collapsible tire building drum, the shoulder assembly comprising:
a plurality of arcuate sections, each section having at least one tenon extending from a first end and at least one groove extending from an opposite second end, the tenons and grooves being configured to allow the sections to slidably interlock with one another along an axial dimension thereof to form a shoulder ring to be mounted on a tire building drum when the tire building drum is in an expanded state;
a first plurality of magnetic elements provided about a surface of the shoulder ring that are configured to magnetically secure the shoulder ring to a side of the tire building drum; and
for each of the first plurality of magnetic elements, an adjustment mechanism configured to adjust a distance between the corresponding magnetic element and a corresponding portion of the side of the tire building drum;

wherein the shoulder ring is configured to maintain contact with the tire building drum during forming of a tire carcass, and wherein the shoulder ring is configured to maintain its shape and detach from the tire building drum when the tire building drum is collapsed.

2. The shoulder assembly of claim 1, the first plurality of magnetic elements being spaced about the shoulder assembly to correspond to a second plurality of magnetic elements in the tire building drum.

3. The shoulder assembly of claim 1, wherein one or more of the sections comprise polyurethane.

4. The shoulder assembly of claim 1, wherein the tenons and grooves are configured to prevent the sections from displacing radially when the tire building drum spins.

5. The shoulder assembly of claim 1, the shoulder ring defining a cylindrical outer working surface having a diameter substantially equal to a diameter of an outer working surface of the tire building drum.

6. The shoulder assembly of claim 5 further comprising a lip extending to cover a portion of a circumference of the tire building drum when the shoulder ring is mounted on the tire building drum.

7. The shoulder assembly of claim 6, wherein the lip is sized to maintain the outer working surface of the shoulder ring flush with the outer working surface of the tire building drum.

8. The shoulder assembly of claim 1, the shoulder ring defining a cylindrical outer working surface having a diameter substantially equal to a diameter of an outer working surface of the tire building drum.

9. The shoulder assembly of claim 8, the shoulder ring further defining an annular outer edge having a curved surface.

10. The shoulder assembly of claim 9, the curved surface defining a shape of an outer bead portion of the tire carcass.

11. An expandable and collapsible tire building drum comprising:
a plurality of arcuate segments supported about a central hub and configured for movement between an expanded position and a collapsed position, whereby in the expanded position, the segments cooperate to define a central portion of a cylindrical working surface having a pair of oppositely disposed circumferential edges;
a shoulder assembly for defining an end portion of the working surface, the shoulder assembly comprising a plurality of arcuate sections, each section having at least one tenon extending from a first end and at least one groove extending from an opposite second end, the tenons and grooves being configured to allow the sections to slidably interlock with one another along an axial dimension of the shoulder assembly to form an outer portion of the cylindrical working surface;

wherein the shoulder assembly is removably magnetically securable to one of the circumferential edges of the central portion of the working surface;
a first plurality of magnetic elements provided about a surface of the shoulder ring, each magnetic element of the first plurality of magnetic elements configured to form a pair of magnetically secured elements with one of a second plurality of magnetic elements provided about a corresponding circumferential edge of the central portion of the working surface; and
a plurality of adjustment mechanisms, each adjustment mechanism configured to adjust a distance between a corresponding pair of magnetically secured elements when the shoulder assembly is magnetically secured to a circumferential edge of the central portion of the working surface.

12. The expandable and collapsible tire building drum of claim 11, wherein movement of the plurality of arcuate segments toward the collapsed position results in displacement of each pair of magnetically secured elements in relation to one another in a direction normal to the magnetic force of attraction of the pair of magnetically secured elements.

13. The expandable and collapsible tire building drum of claim 11, wherein at least one of the magnetic elements of each pair of magnetically secured elements has a position which is adjustable in relation to the other of the magnetic elements, whereby adjustment of the position results in a change in the force of attraction between the pair of magnetically secured elements.

14. The expandable and collapsible tire building drum of claim 11, wherein the tenons and grooves are configured to prevent the sections from displacing radially when the tire building drum spins.

15. The expandable and collapsible tire building drum of claim 11, wherein the outer portion of the cylindrical working surface defines a cylindrical surface and an adjacent curved outer edge defining a shape of a tire carcass.

16. The expandable and collapsible tire building drum of claim 11, wherein the arcuate segments cooperate to define a first annular lip disposed radially inward from the central portion of the working surface and extending axially outward from a corresponding circumferential edge of the central portion of the working surface.

17. The expandable and collapsible tire building drum of claim 16, the shoulder assembly further comprising a second annular lip extending to cover the first annular lip when the shoulder assembly is magnetically secured to a corresponding circumferential edges of the central portion of the working surface.

18. The expandable and collapsible tire building drum of claim 17, wherein the first and second annular lips cooperate to hold the outer portion of the working surface flush with the central portion of the working surface.

* * * * *